(12) United States Patent
Baker et al.

(10) Patent No.: US 10,119,499 B2
(45) Date of Patent: Nov. 6, 2018

(54) EXHAUST GAS RECIRCULATION SYSTEM AND METHOD FOR OPERATION THEREOF

(71) Applicant: Ford Global Technologies, LLC, Dearborn, MI (US)

(72) Inventors: Chad Allan Baker, Ypsilanti, MI (US); Gregory Patrick McConville, Ann Arbor, MI (US); William Samuel Schwartz, Pleasant Ridge, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 127 days.

(21) Appl. No.: 15/418,600

(22) Filed: Jan. 27, 2017

(65) Prior Publication Data

US 2018/0216581 A1 Aug. 2, 2018

(51) Int. Cl.
*F02M 26/15* (2016.01)
*F02M 26/21* (2016.01)
(Continued)

(52) U.S. Cl.
CPC .......... *F02M 26/26* (2016.02); *F01N 3/0205* (2013.01); *F01N 3/043* (2013.01); *F01N 5/02* (2013.01); *F01P 7/14* (2013.01); *F01P 7/16* (2013.01); *F02M 26/15* (2016.02); *F02M 26/21* (2016.02); *F02M 26/22* (2016.02); *F02M 26/28* (2016.02); *F02M 26/30* (2016.02); *F02M 26/32* (2016.02); *F01N 2240/02* (2013.01); *F01N 2240/36* (2013.01); *F01N 2390/08* (2013.01); *F01N 2410/00* (2013.01); *F01N 2900/1404* (2013.01); *F01N 2900/1406* (2013.01); *F01P 2007/146* (2013.01)

(58) Field of Classification Search
CPC .......... F01N 3/0205; F01N 3/043; F01N 5/02; F01N 2240/02; F01N 2240/36; F01N 2390/08; F01N 2410/00; F01N 2900/1404; F01N 2900/1406; F02M 26/15; F02M 26/21; F02M 26/22; F02M 26/26; F02M 26/28; F02M 26/30; F02M 26/32; F01P 7/14; F01P 7/16; F01P 7/146
USPC ...... 60/273; 123/568.12, 41.02, 41.04–41.06
See application file for complete search history.

(56) References Cited

U.S. PATENT DOCUMENTS 7,163,005 B2  1/2007 Tussing et al.
8,181,610 B2  5/2012 Dipaola et al.
(Continued)

OTHER PUBLICATIONS

Uhrich, Michael James, et al., "Method and System for Exhaust Gas Heat Recovery," U.S. Appl. No. 15/010,382, filed Jan. 29, 2016, 70 pages.

(Continued)

Primary Examiner — Jorge Leon, Jr.
Assistant Examiner — Dapinder Singh
(74) Attorney, Agent, or Firm — Julia Voutyras; McCoy Russell LLP

(57) ABSTRACT

An engine system is provided. The engine system may include an exhaust gas heat exchanger valve including an actuatable valve plate, a valve actuation assembly adjusting the position of the valve plate through operation of mechanical linkage coupled to the valve plate, and a flow reversal valve positioned in a coolant passage, the flow reversal valve configured to reverse the coolant flow in a flapper coolant conduit to trigger actuation of the mechanical linkage.

20 Claims, 5 Drawing Sheets

(51) Int. Cl.
    *F01N 3/20*     (2006.01)
    *F02M 26/26*     (2016.01)
    *F02M 26/28*     (2016.01)
    *F02M 26/30*     (2016.01)
    *F01N 3/02*     (2006.01)
    *F01P 7/14*     (2006.01)
    *F01P 7/16*     (2006.01)
    *F02M 26/22*     (2016.01)
    *F02M 26/32*     (2016.01)
    *F01N 5/02*     (2006.01)
    *F01N 3/04*     (2006.01)

(56) References Cited

U.S. PATENT DOCUMENTS

| | | |
|---|---|---|
| 2008/0314037 A1 | 12/2008 | Neels et al. |
| 2012/0180452 A1 | 7/2012 | Caine |
| 2014/0007575 A1* | 1/2014 | Ernst ............... F01K 23/065 60/618 |
| 2014/0116050 A1* | 5/2014 | Seo ............... F01K 3/00 60/659 |
| 2016/0109890 A1 | 4/2016 | Styron et al. |
| 2016/0115910 A1 | 4/2016 | Bramson |
| 2016/0138430 A1* | 5/2016 | Son ............... F01K 23/10 60/618 |
| 2016/0252055 A1* | 9/2016 | Nair ............... F02M 26/16 123/568.12 |

OTHER PUBLICATIONS

Styles, Daniel Joseph, et al., "Method and System for Exhaust Gas Heat Recovery," U.S. Appl. No. 15/010,537, filed Jan. 29, 2016, 72 pages.
Styles, Daniel Joseph, et al., "Methods and Systems for Exhaust Gas Heat Recovery," U.S. Appl. No. 15/053,827, filed Feb. 25, 2016, 68 pages.
Uhrich, Michael James, et al., "Method and System for an Exhaust Catalyst," U.S. Appl. No. 15/228,538, filed Aug. 4, 2016, 51 pages.
Schwartz, William Samuel, et al., "Method and System for Exhaust Gas Recirculation and Heat Recovery," U.S. Appl. No. 15/341,973, filed Nov. 2, 2016, 65 pages.

* cited by examiner

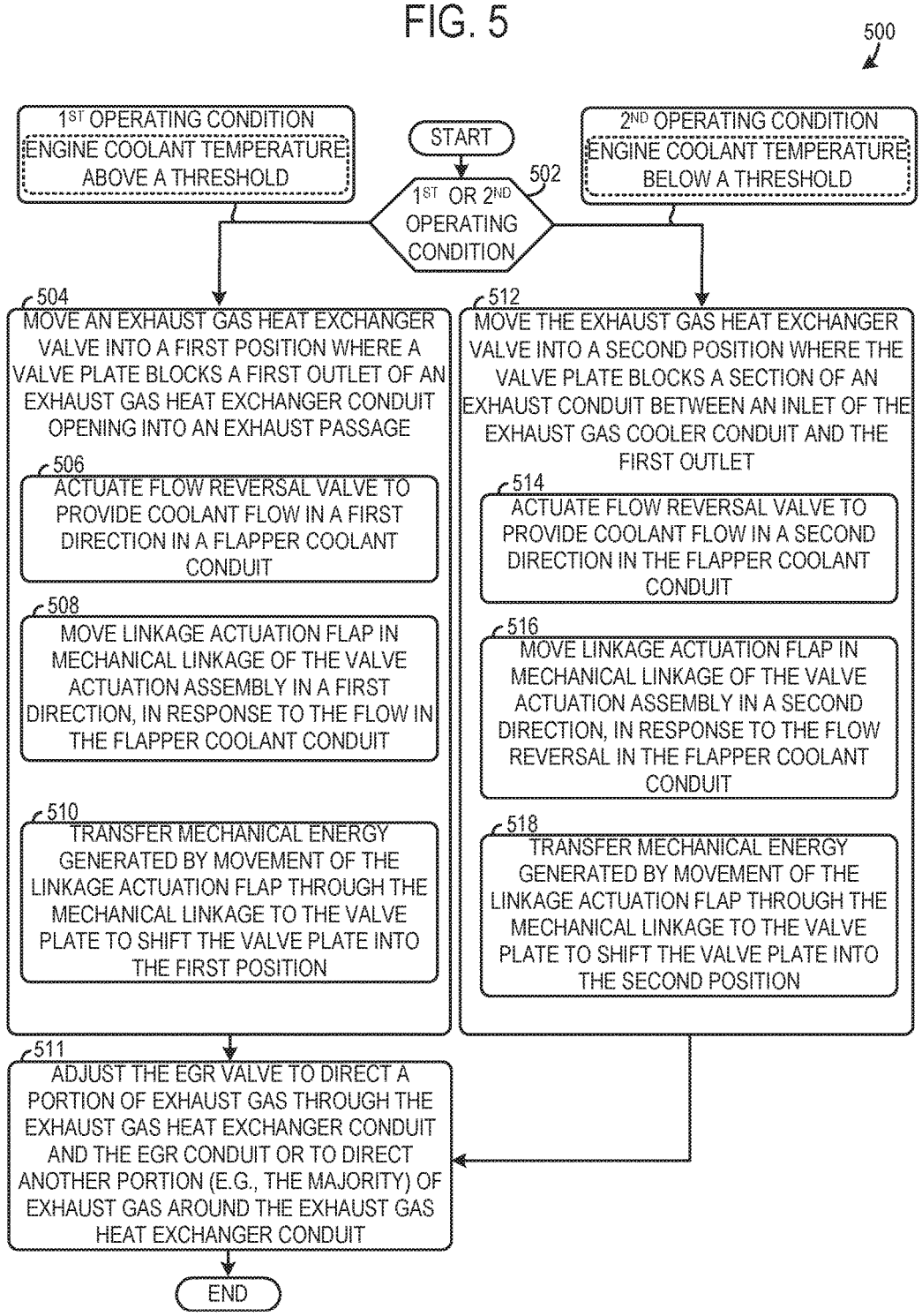

EXHAUST GAS RECIRCULATION SYSTEM AND METHOD FOR OPERATION THEREOF

BACKGROUND/SUMMARY

During some operating conditions of an internal combustion engine it is desirable to provide exhaust gas cooling to an exhaust gas recirculation (EGR) loop or extract heat from the exhaust gas to warm the engine coolant. During other conditions, it is desirable to allow exhaust gas flow to downstream components without passing through a heat exchanger and transferring heat to the engine coolant. In previous engines the exhaust system may be designed to direct cooled exhaust gas to both the EGR loop and downstream exhaust components. A valve augmenting the exhaust gas flow from the heat exchanger to the EGR loop and the downstream exhaust components can be provided in these systems. The valve functions to alter the amount of exhaust gas flowing through the heat exchanger. In prior exhaust systems the valve is actuated via a controller and a solenoid or electric motor. Actuating the valve using a controller and a solenoid has several drawbacks, one being the large number of electronics required to wire the actuation system. For instance, an electronic control unit (ECU), wiring leads, wiring harnesses, etc., may be needed to actuate the valve. The actuation electronics may be susceptible to failure from environmental factors, such as water exposure and vehicle as well as engine vibration. Moreover, the electronics may also require calibration and control strategies that are expensive to develop and computationally intensive to deploy in a control system.

As such in one approach, an engine system is provided. The engine system may include an exhaust gas heat exchanger valve including an actuatable valve plate and a valve actuation assembly adjusting the position of the valve plate. The engine system further includes a flow reversal valve positioned in a coolant passage, the flow reversal valve configured to reverse the coolant flow in a flapper coolant conduit to trigger actuation of the mechanical linkage. The flow reversal valve and mechanical linkage enable the valve plate to be passively actuated to avoid the use of a controller for valve actuation, if desired. Consequently, the reliability and longevity of the valve actuation assembly can be increased when compared to electronic actuation systems.

The inventors herein have recognized the above issues and potential options to address them. The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 5 shows a method for operation of an engine system including an exhaust gas heat exchanger valve and a corresponding valve actuation assembly.

DETAILED DESCRIPTION

This description relates to systems and methods for actuating an exhaust gas heat exchanger valve that augments cooled exhaust gas flow to an exhaust gas recirculation (EGR) system and an exhaust system. The exhaust gas heat exchanger valve is actuated through a series of mechanisms that enable the exhaust gas heat exchanger valve to be adjusted into a first position and a second position based on the temperature of coolant in a coolant conduit supplying coolant to the exhaust gas heat exchanger. In the first position, the exhaust gas heat exchanger valve directs exhaust gas through an exhaust gas heat exchanger conduit into an EGR passage by blocking a first outlet of the exhaust gas heat exchanger opening into an exhaust passage. On the other hand, in the second configuration the exhaust gas heat exchanger valve directs exhaust gas through an exhaust gas heat exchanger conduit and back into an exhaust passage flowing exhaust gas to downstream components and ultimately the surrounding environment. To achieve the flow pattern in the second position, the exhaust gas heat exchanger valve blocks a section of an exhaust passage between an inlet of the exhaust gas heat exchanger conduit and the first outlet.

The valve actuation mechanisms may include a temperature dependent flow reversal valve positioned in a coolant conduit and mechanical linkage. The temperature dependent flow reversal valve changes the coolant flow direction in a coolant branch branching from the coolant conduit to initiate actuation of a linkage actuation flap, in one example. In such an example, the change in flow direction in the coolant branch rotates the linkage actuation flap about a pivot. Pivoting the linkage actuation flap moves external links hinged to one another. In turn, the movement of the external links urges the valve plate into discrete positions. Constructing an exhaust gas heat exchanger valve and corresponding actuation mechanisms in this way provides reliable and temperature dependent valve actuation when compared to electronic valve actuation devices which may be more susceptible to damage from water, vibration, etc. As a result, the longevity and dependability of the valve and corresponding actuation mechanisms can be increased. Furthermore, the valve actuation mechanisms described herein may not require any control or calibration strategies of an electronic control unit (ECU). As such, development and manufacturing costs of the engine system can be reduced.

Figure 1:
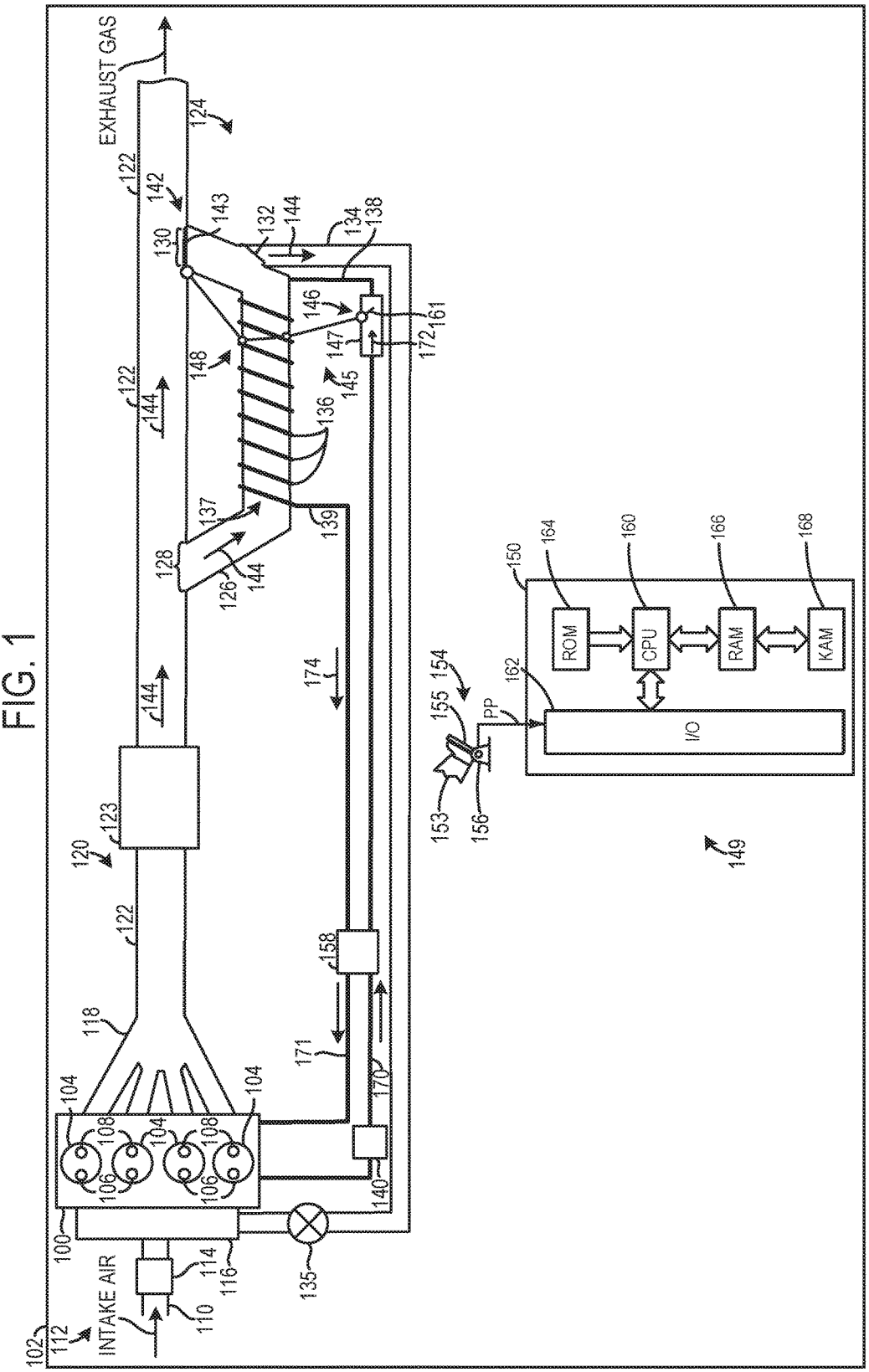
FIG. 1 shows a depiction of an engine system in an engine, the engine system including an exhaust gas heat exchanger valve in a first position.

FIG. 1 shows an engine 100 in a vehicle 102. The engine 100 includes cylinders 104, intake valves 106, and exhaust valves 108 that facilitate combustion operation in the engine. The engine 100 may include additional components that enable combustion operation such as ignition devices in the case of a spark-ignition engine, valve actuators (e.g., cams, electronic actuators, etc.), pistons, crankshaft, etc. During operation, the cylinders 104 typically undergo a four stroke combustion cycle: the cycle includes the intake stroke, compression stroke, expansion stroke, and exhaust stroke. However, the engine may be configured to implement other suitable combustion cycles.

An intake conduit 110 is also provided in the vehicle 102. The intake conduit 110 enables intake airflow into the cylinders 104. The intake conduit 110 is included in an intake system 112. The intake system 112 also includes a throttle 114 and an intake manifold 116 providing modulated intake airflow to the intake valves 106. It will be appreciated that additional components may be included in the intake system 112 such as one or more air filters, compressors, etc.

An exhaust manifold 118 is provided to enable exhaust gas to be expelled from the cylinders 104. The exhaust manifold 118 may be included in an exhaust system 120. The exhaust system 120 also includes exhaust passages 122 and an emission control device 123 (e.g., catalyst, filter, etc.) The exhaust system 120 may include one or more emission control devices downstream of the section depicted in FIG. 1.

An engine system 124 (e.g., EGR system) may also be included in the vehicle 102. The engine system 124 includes an exhaust gas heat exchanger conduit 126 with an inlet 128, a first outlet 130, and a second outlet 132. The first outlet 130 opens into the exhaust passage 122 and the second outlet 132 opens into an EGR passage 134. As shown, the EGR passage 134 extends between the exhaust gas heat exchanger conduit 126 and the intake manifold 116. However in other examples, the EGR passage 134 may connect to an exhaust passage upstream of the intake manifold 116.

An EGR valve 135 is also coupled to the EGR passage 134. The EGR valve 135 is configured to permit and inhibit exhaust gas flow to varying degrees through the EGR passage 134. Therefore, it will be appreciated that the EGR valve 135 can regulate the amount of exhaust gas flowing into the intake manifold 116. The controller 150 may send control signals to the EGR valve 135.

A coolant conduit 136 may extend around the exhaust gas heat exchanger conduit 126 or may be interspersed within the conduit in a plurality of tubes in various heat exchanger matrix configurations which may include fins and other heat transfer elements. The coolant conduit 136 is configured to remove heat from the exhaust gas traveling through the exhaust gas heat exchanger conduit 126. The coolant conduit 136 and the exhaust gas heat exchanger conduit 126 may be part of an exhaust gas heat exchanger 137. The exhaust gas heat exchanger 137 functions as a heat exchanger removing heat from exhaust gas and transferring the heat to coolant.

Coolant may be provided to the coolant conduit 136 through an input coolant passage 170 and expelled to an output coolant passage 171. As shown, a flow reversal valve 158 and coolant passages 138 and 139 are position between the coolant conduit 136 and the input and output coolant passage 170 and 171. The input coolant passage 170 is therefore positioned upstream of the coolant conduit 136 and the output coolant passage 171 is positioned downstream of the coolant conduit 136. A coolant pump 140 may be coupled to the input coolant passage 170. The coolant pump 140 is configured to adjust the rate of coolant flow through the input coolant passage 170. Additionally, the input coolant passage 170 may receive coolant from coolant conduits (e.g., water jackets) in the engine 100 and the output coolant passage 171 may supply coolant to the engine 100. The direction of coolant flow through coolant passage 138 and 139 depends on the state of flow reversal valve 158. Flow reversal valve 158 includes an actuator that may change the state of the valve based on the temperature of the coolant in coolant passage 170 or 171. Details of the flow reversal valve are described in FIGS. 3A, 3B, 4A, and 4B.

Figure 2:
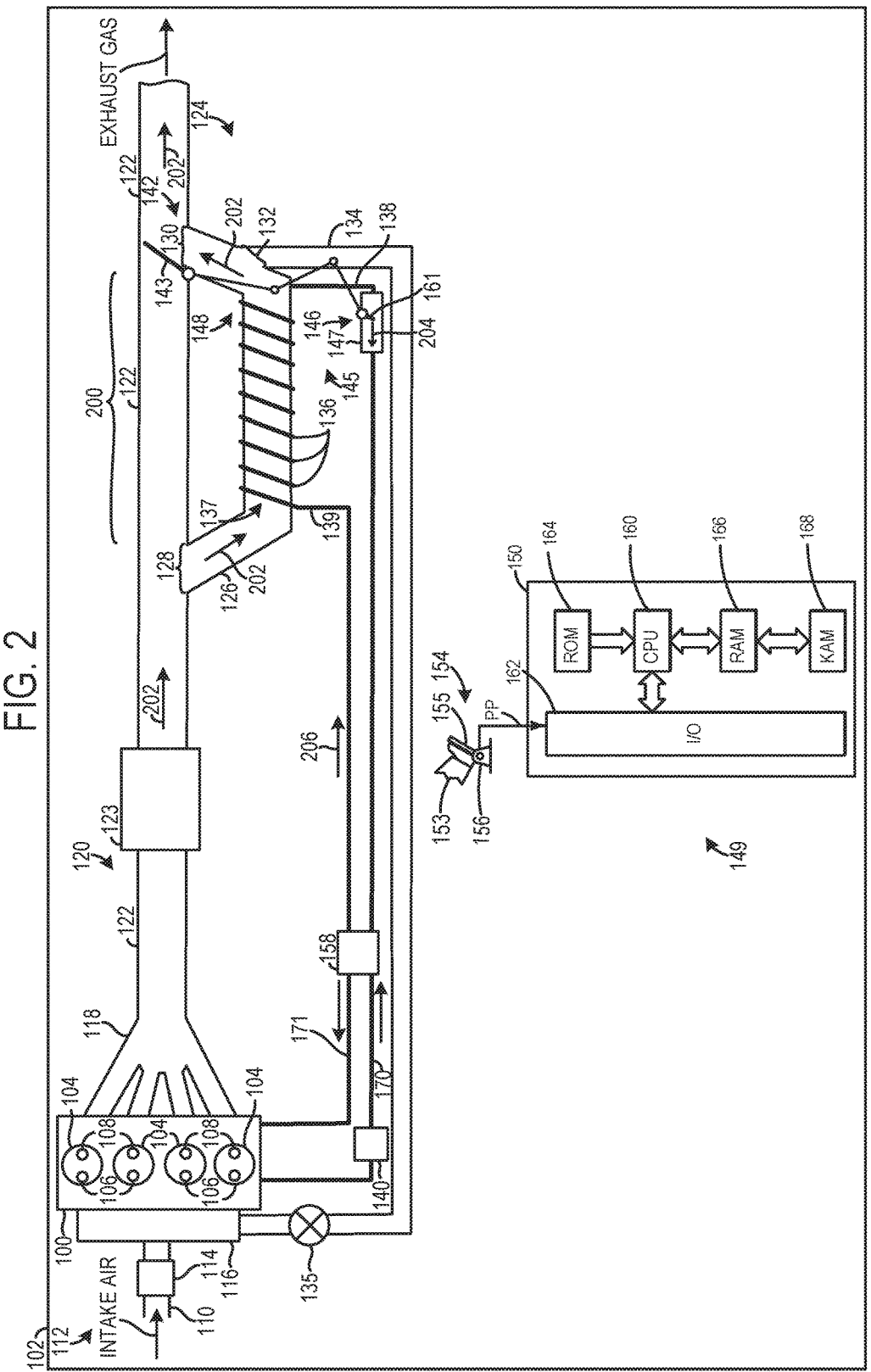
FIG. 2 shows a depiction of the engine system, shown in FIG. 1, with the exhaust gas heat exchanger valve in a second position.

The engine system 124 also includes an exhaust gas heat exchanger valve 142 with a valve plate 143 configured to be actuated into different positions. FIG. 1 depicts the valve plate 143 in a first position where the valve plate 143 blocks the first outlet 130 of the exhaust gas heat exchanger conduit 126. FIG. 2 depicts the valve plate 143 in a second position, discussed in greater detail herein. It will be appreciated that the valve plate 143 may also be positioned in intermediate positions between the first and second positions depicted in FIGS. 1 and 2, in some examples. Continuing with FIG. 1, in the first position the valve plate 143 directs exhaust gas from the exhaust gas heat exchanger conduit 126 to the EGR passage 134 through the second outlet 132. Arrows 144 depict the general direction of this exhaust gas flow pattern. In this way, exhaust gas can be cooled and then directed back to the intake manifold 116, to provide cooled EGR gas to the intake system 112.

The engine system 124 may also include a valve actuation assembly 145 configured to adjust the position of the valve plate 143. The valve actuation assembly 145 includes a flapper valve 146 including a linkage actuation flap 161 internal to a flapper passage 147 which is connected to a linkage which controls the position of valve plate 143. The engine system 124 may also include the flow reversal valve 158. The flow reversal valve 158 is configured to change the direction of coolant flow in coolant passage 138 and coolant passage 139, as previously discussed. The direction of coolant flow in the flapper coolant conduit 147 acts on flapper valve 146 of valve actuation assembly 145. Flapper valve 146 connects to mechanical linkage 148 to move the valve plate 143 into different positions. The specific kinematics of the valve actuation assembly 145 are discussed in greater detail herein with regard to FIGS. 3A, 3B, 4A, and 4B.

Additionally, FIG. 1 shows the general flow direction of coolant through the flapper coolant conduit 147, indicated via arrow 172. Arrow 174 also depicts the general direction of coolant flow through the coolant conduit 139. As such, coolant flows from the coolant conduit 138 to the coolant conduit 139.

A controller 150 may be configured to receive signals from sensors in the engine 100 and engine system 124 as well as send command signals to components such as the throttle 114, coolant pump 140, EGR valve 135, etc., to adjust operation of the components. In one example, the controller 150 may not be configured to adjust operation of the exhaust gas heat exchanger valve 142. Various components in the vehicle 102 may be controlled at least partially by a control system 149 including the controller 150 and by input from a vehicle operator 153 via an input device 154. The control system 149 may also include actuators and/or other component for adjusting injectors, valves, etc., and sensors described herein. In this example, input device 154 includes an accelerator pedal 155 and a pedal position sensor 156 for generating a proportional pedal position signal PP. The controller 150 is shown in FIG. 1 as a microcomputer, including processor 160 (e.g., microprocessor unit), input/output ports 162, an electronic storage medium for executable programs and calibration values shown as read only memory 164 (e.g., read only memory chip) in this particular example, random access memory 166, keep alive memory 168, and a data bus.

In some examples, during actuation of the exhaust gas heat exchanger valve 142 the output of the coolant pump 140 may be increased when valve actuation is initiated to decrease the duration of valve actuation. For example, a sudden increase in coolant flow by the coolant pump can cause the mechanical linkage to be actuated more rapidly. As a result, the actuation performance of the exhaust gas heat exchanger valve 142 is improved by reducing actuation delays in the valve.

Storage medium read-only memory 164 can be programmed with computer readable data representing instructions executable by processor 160 for performing the methods described below as well as other variants that are anticipated but not specifically listed.

FIG. 2 shows the exhaust gas heat exchanger valve 142 in the second position where the valve plate 143 blocks a section 200 of the exhaust passage 122 between the inlet 128 of the exhaust gas heat exchanger conduit 126 and the first outlet 130 of the exhaust gas heat exchanger conduit 126. FIG. 2 illustrates numerical indicators of the components of the vehicle 102, engine 100, and engine system 124 that are described with regard to FIG. 1. However, redundant component descriptions have been omitted to avoid redundancy.

In the second position the exhaust gas heat exchanger valve 142 enables exhaust gas to flow into the exhaust gas heat exchanger conduit 126 and through the first outlet 130 of the exhaust gas heat exchanger conduit 126 back into the exhaust passage 122. In this way, exhaust heat from the entire exhaust flow may be transferred to the engine coolant. Arrows 202 depict the general direction of exhaust gas flow when the exhaust gas heat exchanger valve 142 is in the second position.

Additionally, as shown in FIG. 2, arrow 204 depicts the general flow direction of coolant through the flapper coolant conduit 147 and arrow 206 depicts the general direction of coolant flow through the coolant conduit 139. As such, coolant flows from the coolant conduit 138 to the coolant conduit 139.

Figure 3A:
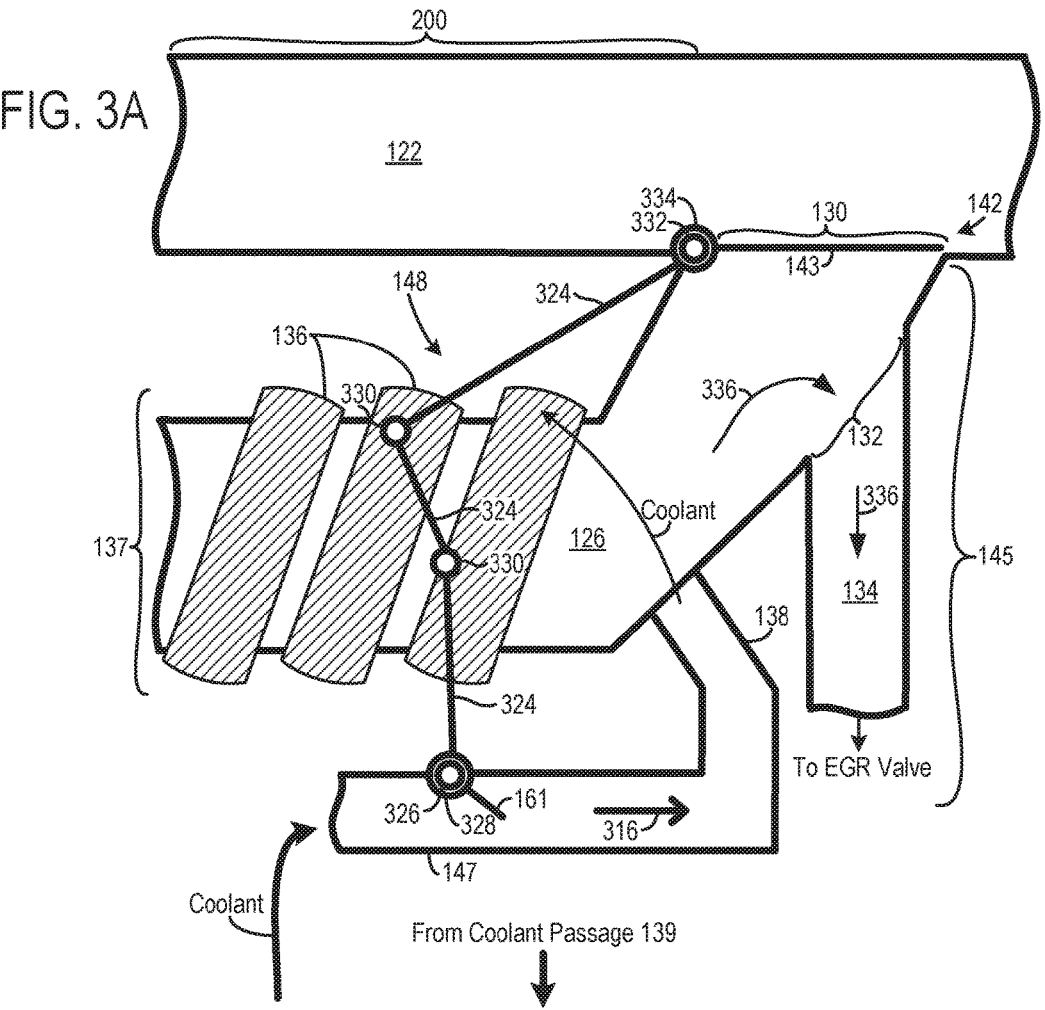
FIGS. 3A and 3B show a detailed view of the exhaust gas heat exchanger valve in the first position and the corresponding valve actuation assembly.
Figure 3B:
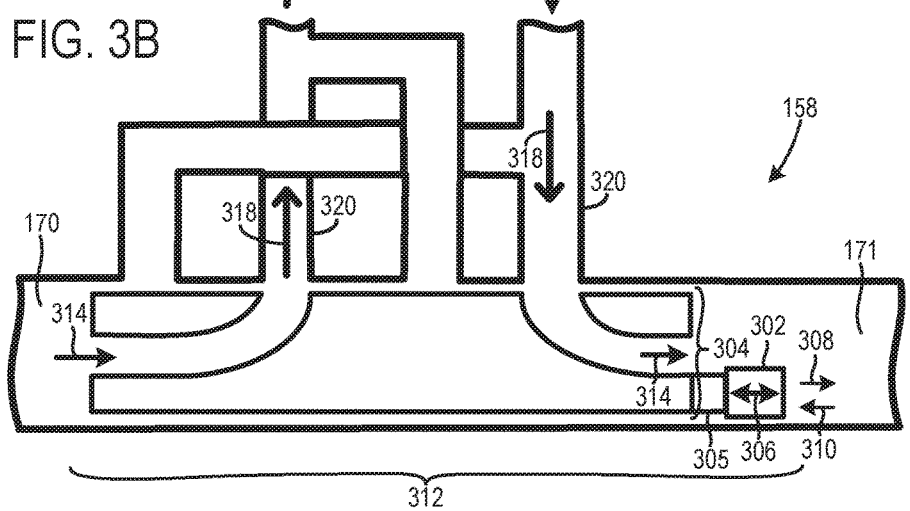
Figure 4A:
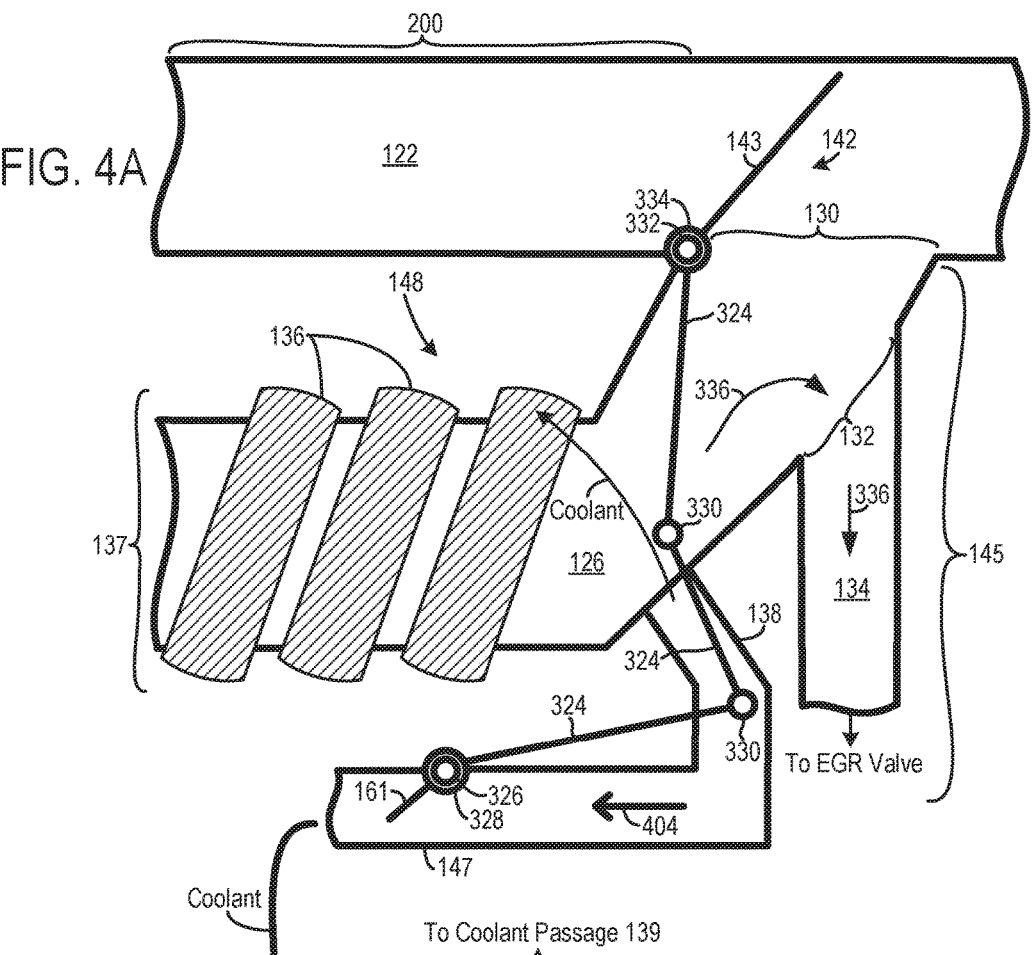
FIGS. 4A and 4B show a detailed view of the exhaust gas heat exchanger valve in the second position and the corresponding valve actuation assembly.
Figure 4B:
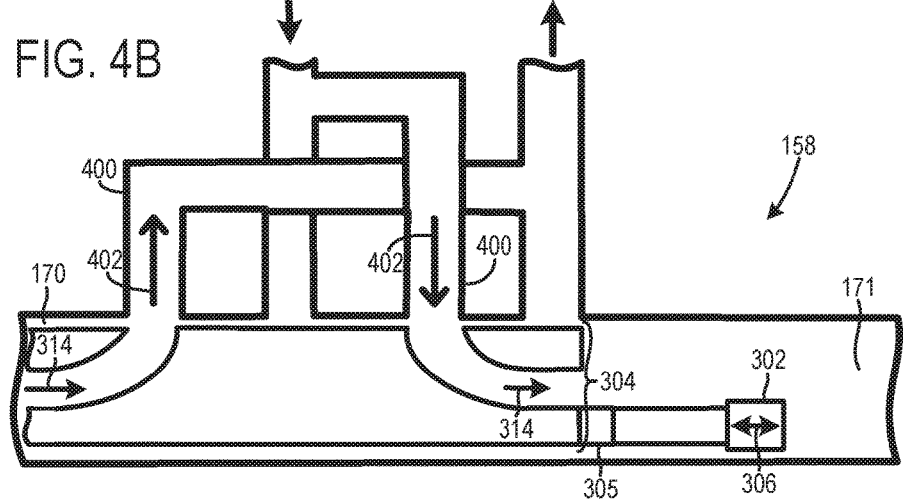

FIGS. 3A, 3B, 4A, and 4B show more detailed embodiments of the exhaust gas heat exchanger valve 142 and corresponding valve actuation assembly 145. The valve actuation assembly 145 can enable the exhaust gas heat exchanger valve to be passively actuated based on the temperature of coolant flowing through the input coolant passage 170 or outlet coolant passage 171. The passive actuation enables the longevity and dependability of the valve and corresponding actuation mechanism to be increased when compared to electronic valve actuation devices. FIGS. 3A and 3B shows the exhaust gas heat exchanger valve 142 in the first position and FIGS. 4A and 4B shows the exhaust gas heat exchanger valve 142 in the second position.

Specifically referring to FIG. 3A, the section 200 of the exhaust passage 122 between the inlet 128 of the exhaust gas heat exchanger conduit 126, shown in FIGS. 1 and 2, and the first outlet 130 of the exhaust gas heat exchanger conduit 126 is depicted in detail.

As shown in FIG. 3B, the flow reversal valve 158 includes a wax motor 302 or other suitable actuation device such as a solenoid valve. Advantages of the wax valve includes reliable and in some cases passive (e.g., controller independent) actuation. However, one advantage of using a solenoid valve in this manner is the ability to control valve 143 based on inputs other than engine coolant temperature, such as engine power level. An advantage of a solenoid to control the flow reversal valve instead of controlling the plate 143 is that a solenoid in this location in the vehicle (e.g., underhood) is less susceptible to damage from road debris and water submersion compared to the underbody location near valve 143. The wax motor 302 is configured to move a slide valve 304 into a forward flow position, illustrated in FIGS. 3A and 3B, or a reverse flow position, illustrated in FIGS. 4A and 4B, based on the temperature of the coolant in the coolant conduit 171. Alternately, the wax motor 302 could be placed at the other end of the slide valve 304 to react to the temperature in coolant passage 170. Specifically, the wax motor 302 moves the slide valve in linear directions, denoted via arrows 306. Further in one example, the wax motor 302 is configured to convert thermal energy into linear movement (i.e., mechanical energy) by using phase change behavior of waxes. The wax motor 302 may be configured to move the slide valve 304 in a first direction 308 when the coolant is above a threshold temperature to place the slide valve 304 in the forward flow position shown in FIGS. 3A and 3B. The wax motor 302 may also be configured to move the slide valve 304 in a second direction 310 when the coolant is below the threshold temperature to place the slide valve 304 in the reverse flow position shown in FIGS. 4A and 4B.

A spring mechanism 305 included in the valve actuation assembly is positioned between the wax motor 302 and the slide valve 304. The spring mechanism 305 is configured to decrease an actuation duration between the forward flow position and the reverse flow position of the slide valve 304. For instance, the spring mechanism 305 urges the slide valve 304 into the discrete forward and reverse flow positions more quickly. The actuation duration may be defined as the time interval starting when the slide valve 304 is actuated by the wax valve and ending when the slide valve reaches the desired position (i.e., a forward or reverse flow position). In this way, delays in valve actuation can be reduced thereby improving operation of the exhaust gas heat exchanger valve 142.

As depicted in FIGS. 3A and 3B, in the forward flow position the slide valve 304 directs coolant through coolant branch sections that enable coolant to flow from the coolant passage 170 feeding coolant to the flapper coolant conduit 147, coolant passage 138, exhaust gas heat exchanger 137, coolant passage 139 and finally back to coolant passage 171. Arrows 314 depicts the general direction of coolant flow into and out of the flow reversal valve 158 from or into the coolant passage section 312. Additionally, arrow 318 depict the general direction of coolant flow through conduits 320 in the flow reversal valve 158. Specifically, in the flow reversal valve configuration shown in FIGS. 3A and 3B coolant is flowed from coolant passage 139, shown in FIG. 1, into the flow reversal valve 158. Furthermore, in the flow reversal valve configuration shown in FIGS. 3A and 3B coolant is flowed from the flow reversal valve 158 into the flapper coolant conduit 147. The flow reversal valve 158 also receives coolant from the coolant passage 170 and flows coolant into coolant passage 171. Arrow 316 depicts the general direction of coolant flow through the flapper coolant conduit 147.

The forward flow direction of the coolant in the flapper coolant conduit 147, denoted via arrow 316, will move (e.g., rotate in a counter-clockwise direction) the linkage actuation flap 161 in the flapper valve 146 of the mechanical linkage 148 into a first position. Movement of the linkage actuation flap 161 will initiate movement of external links 324 in the mechanical linkage 148 to change the position of the valve plate 143. Specifically, the linkage actuation flap 161 rotates about a first pivot 326. The first pivot 326 is coupled to the external links 324. A first seal 328 is provided around the first pivot 326 to reduce the likelihood of coolant leakage from the flapper coolant conduit 147. Linkage hinges 330 are positioned between each of the external links to enable the position of the external links to shift in response to movement of the linkage actuation flap 161. In turn, the external links 324 rotate the valve plate 143 about a second pivot 332. Specifically, the valve plate 143 rotates in a clockwise direction when the plate is moved into the first position, illustrated in FIGS. 3A and 3B. A second seal 334 is provided around the second pivot 332 to reduce the likelihood of exhaust gas leakage from the exhaust passage 122. Additionally, the external links 324 and the linkage hinges 330 are positioned external to the exhaust passage 122, the exhaust gas heat exchanger conduit 126, and the flapper coolant conduit 147, the coolant passage 138, and the coolant conduit 136, to prevent interference between the aforementioned components.

As shown in FIGS. 3A and 3B, when the exhaust gas heat exchanger valve 142 is in the first position and the EGR valve 135, shown in FIG. 1, is open, the exhaust gas flow from the exhaust gas heat exchanger conduit 126 into the EGR passage 134 through the second outlet 132, denoted through arrows 336. However, it will be appreciated that when the exhaust gas heat exchanger valve 142 is in the first position and the EGR valve 135 shown in FIG. 1 is closed, exhaust gas bypasses the exhaust gas heat exchanger conduit 126 and flows through the section 200 of the exhaust passage 122.

In one example, during high load engine operation (e.g., wide open throttle), exhaust backpressure at the exhaust manifold and/or heat transfer to the coolant may be excessive if the majority of the exhaust passes through the exhaust gas heat exchanger 137. Therefore, to reduce engine back pressure and/or heat transfer to the coolant, valve 142 may be designed to be in the first position when the volume flow rate of the exhaust gas flowing through the exhaust passage 122 is above a threshold amount. In such an example, the shapes of both the linkage actuation flap 161 and the valve plate 143 may be designed such that the pressure of the exhaust flow forces the exhaust gas heat exchanger valve 142 into the first position. Specifically, when exhaust gas flow begins to exceed a threshold amount, the pressure it imparts on valve plate 143 will convey enough force on linkage 148 to move linkage actuation flap 161 at least partially into a position opposing the flow of coolant in flapper circuit 147. As the valve plate moves, it will allow a path for some exhaust gas to travel through exhaust passage 122 therefore reducing the backpressure on the engine, and heat transfer to the coolant.

The valve actuation assembly 145 enables the exhaust gas heat exchanger valve 142 to be passively moved into the first and second positions based on coolant temperature. For instance, the exhaust gas heat exchanger valve 142 may be moved into the second position, shown in FIGS. 4A and 4B, during engine warm-up when the engine is below a threshold temperature. On the other hand, the exhaust gas heat exchanger valve 142 may be moved into the first position, shown in FIGS. 3A and 3B, subsequent to engine warm-up when the engine is above the threshold temperature. A passive actuation assembly designed in this way may be more reliable and less susceptible to failure from environmental factors (e.g., moisture) when compared to electronic actuation systems.

FIGS. 4A and 4B shows the exhaust gas heat exchanger valve 142 in the second position. FIGS. 4A and 4B illustrates numerical indicators of the components of the engine system 124 that are described with regard to FIGS. 3A and 3B. However, redundant component descriptions have been omitted. In FIGS. 4A and 4B the wax motor 302 has linearly urged the slide valve 304 into a reverse flow configuration.

As depicted in FIGS. 4A and 4B, in the reverse flow position the slide valve 304 directs coolant through coolant branch sections that enable coolant to flow from the coolant passage 170 feeding coolant to coolant passage 139, exhaust gas heat exchanger 137, coolant passage 138, flapper coolant conduit 147, and finally back to coolant passage 171. In the reverse flow configuration the slide valve 304 directs coolant through coolant branch sections 400 connected to the flapper coolant conduit 147 to reverse the direction of coolant flow in the flapper coolant conduit 147. Arrows 402 denote the general flow of coolant through the coolant branch sections 400. Arrow 404 depicts a reverse flow direction of coolant through the flapper coolant conduit 147. Thus in the reverse flow configuration of the slide valve 304, shown in FIGS. 4A and 4B, the direction of coolant flow, denoted via arrow 404, in the flapper coolant conduit 147 opposes the direction of coolant flow, denoted via arrows 314, in the section 312 of the coolant passage 138. Reversing the direction of coolant flow in the flapper coolant conduit 147 exerts a force on the linkage actuation flap 161 to rotate the linkage actuation flap 161 in a clockwise direction about the first pivot 326. In turn, rotation of the linkage actuation flap 161 triggers movement of the external links 324 which initiates rotation of the valve plate 143 in a counter-clockwise direction to move the valve plate 143 into the second position. As shown in FIGS. 4A and 4B, when the valve plate 143 is in the second position exhaust gas flows through the first outlet 130 of the exhaust gas heat exchanger conduit 126 into the exhaust passage 122 downstream of the valve plate 143, denoted via arrows 406. In this way, exhaust heat can be transferred to the engine coolant while cooled exhaust gas can flow to downstream components in the exhaust system.

FIG. 5 shows a method 500 for operating an engine system. The method 500 may be implemented by the engine system described above with regard to FIGS. 1-4B or another suitable engine system. Specifically in one example, the method 500 may be implemented by the exhaust gas heat exchanger valve and corresponding valve actuation assembly without inputs from a controller. However, in other examples a controller may be used to command components in the valve actuation assembly.

At 502 the method includes determining if the engine system is operating under a first or second operating condition. In one example, the first operating condition may be when the coolant in a coolant passage is above a threshold temperature and the second operating condition may be when the coolant in the coolant passage is below a threshold temperature. For instance, the second operating condition may be an engine warm-up phase and the first operating condition may an engine phase subsequent to engine warm-up.

At 504 the method includes during a first operating condition, moving an exhaust gas heat exchanger valve into a first position where a valve plate blocks a first outlet of an exhaust gas heat exchanger conduit opening into an exhaust passage. In one example, in the first position some of the exhaust gas flows from the exhaust gas heat exchanger conduit to the intake system.

Moving the exhaust gas heat exchanger valve into the first position may include steps 506-510. At 506 the method includes actuating flow reversal valve to provide coolant flow in a first direction (e.g., forward flow direction) in a flapper coolant conduit. At 508 the method includes moving linkage actuation flap in mechanical linkage of the valve actuation assembly in a first direction, in response to the flow in the flapper coolant conduit. At 510 the method includes transferring mechanical energy generated by movement of the linkage actuation flap through the mechanical linkage to the valve plate to shift the valve plate into the first position. Specifically in one example, the exhaust gas heat exchanger valve may be moved into a first position through temperature dependent actuation of a wax motor, the wax motor moving a slide valve in the temperature dependent activation mechanism into a forward flow position.

At 511 the method includes adjusting the EGR valve to direct a portion of the exhaust gas through the exhaust gas heat exchanger conduit and the EGR passage or to direct another portion (e.g., the majority) of the exhaust gas around the exhaust gas heat exchanger conduit. When the EGR valve is open to direct some of the exhaust gas to the intake, the remainder of the exhaust gas does not flow through the exhaust gas heat exchanger, but instead bypasses the exhaust gas heat exchanger. In this way, the EGR valve may be actuated to implement EGR operation or implement complete exhaust gas flow bypass of the exhaust gas heat exchanger. It will be appreciated that the EGR valve may be adjusted based on engine operating conditions. For instance, the EGR valve may be opened when the engine speed is below a threshold value and above a threshold idle speed to prevent a reduction in peak power output and rough idle.

If the engine system is operating under a second operating condition, the method includes at 512, moving the exhaust gas heat exchanger valve into a second position where the valve plate blocks a section of an exhaust conduit between an inlet of the exhaust gas heat exchanger conduit and the first outlet. In one example, in the second position exhaust gas is flowed from the exhaust gas heat exchanger conduit to a downstream exhaust conduit.

Moving the exhaust gas heat exchanger valve into the second position may include steps 514-518. At 514 the method includes actuating flow reversal valve to reverse the flow of coolant in the flapper coolant conduit. At 516 the method includes moving linkage actuation flap in mechanical linkage of the valve actuation assembly in a second direction, in response to the flow reversal in the flapper coolant conduit. At 518 the method includes transferring mechanical energy generated by movement of the linkage actuation flap through the mechanical linkage to the valve plate to shift the valve plate into the second position. Further in one example the method 500 may include an additional step of increasing the pressure of a coolant flow provided to the flow reversal valve to increase an actuation speed of the exhaust gas heat exchanger valve. This additional step may be implemented while the exhaust gas heat exchanger valve is moved into the first position and/or the second position. Specifically in one example, the method may further include increasing the pressure of a coolant flow provided to the flow reversal valve to enable actuation of the exhaust gas heat exchanger valve in a situation where a higher pressure is needed to overcome the exhaust gas pressure opposing actuation of the exhaust gas heat exchanger valve. In another example, the method may further include increasing the pressure of a coolant flow provided to the flow reversal valve through an increase in the speed of the coolant pump providing the coolant flow and pressure. It will be appreciated that in some examples, the steps of increasing the pressure of the coolant flow may be implemented during the first and/or second operating condition.

Method 500 enables the exhaust gas heat exchanger valve to be passively actuated based on the temperature of coolant in the engine through a series of reliable mechanical components. As a result, the longevity and dependability of the valve and corresponding actuation mechanism can be increased. Moreover, when the exhaust gas heat exchanger valve is passively actuated such that ECU control and calibration strategies for the valve are not needed, enabling a reduction in development and manufacturing costs of the system.

The figures show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The subject matter of the present disclosure is further described in the following paragraphs. According to one aspect, an engine system is provided. The engine system includes an exhaust gas heat exchanger valve including an actuatable valve plate, a valve actuation assembly adjusting the position of the valve plate through operation of mechanical linkage coupled to the valve plate, and a flow reversal valve positioned in a coolant passage, the flow reversal valve configured to reverse the coolant flow in a flapper coolant conduit to trigger actuation of the mechanical linkage.

In another aspect, a method for operation of an engine system is provided. The method includes during a first operating condition, moving an exhaust gas heat exchanger valve into a first position where a valve plate blocks a first outlet of an exhaust gas heat exchanger conduit opening into an exhaust passage, the exhaust gas heat exchanger valve moved into the first position through a valve actuation assembly and a flow reversal valve positioned in a coolant passage, the flow reversal valve configured to reverse the coolant flow in a flapper coolant conduit of the coolant passage to trigger actuation of mechanical linkage coupled to the valve plate and during a second operating condition, moving the exhaust gas heat exchanger valve into a second position where the valve plate blocks a section of an exhaust passage between an inlet of the exhaust gas heat exchanger conduit and the first outlet.

In another aspect, an exhaust gas recirculation (EGR) system is provided. The EGR system includes an exhaust gas heat exchanger valve including an actuatable valve plate, the valve plate being actuatable into a first and second position, in the first position the valve plate blocks a first outlet of an exhaust gas heat exchanger conduit and in the second position the valve plate blocks a section of an exhaust passage between an inlet of the exhaust gas heat exchanger conduit and the first outlet, a valve actuation assembly adjusting the position of the valve plate through operation of mechanical linkage coupled to the valve plate, and a flow reversal valve positioned in a coolant passage, the flow reversal valve configured to reverse the coolant flow in a flapper coolant conduit to trigger actuation of the mechanical linkage.

In any of the aspects described herein or combinations of the aspects, the valve plate may be actuatable into a first and second position, in the first position the valve plate may block a first outlet of an exhaust gas heat exchanger conduit and in the second position the valve plate may block a section of an exhaust conduit between an inlet of the exhaust gas heat exchanger conduit and the first outlet, the first outlet opening into the exhaust conduit.

In any of the aspects described herein or combinations of the aspects, a second outlet of the exhaust gas heat exchanger conduit may open into an exhaust gas recirculation (EGR) passage having a EGR valve.

In any of the aspects described herein or combinations of the aspects, the engine system may further include an exhaust gas heat exchanger including a heat transfer element having one or more of a coolant conduit extending around the exhaust gas heat exchanger conduit and a heat exchanger matrix including a plurality of tubes.

In any of the aspects described herein or combinations of the aspects, the flow reversal valve may include a wax motor configured to move a slide valve in the flow reversal valve into a forward flow position and a reverse flow position.

In any of the aspects described herein or combinations of the aspects, the engine system may further include a spring mechanism positioned between the wax motor and the slide valve, the spring mechanism configured to decrease an actuation duration between the forward flow position and the reverse flow position of the slide valve.

In any of the aspects described herein or combinations of the aspects, a linkage actuation flap may be positioned in the flapper coolant conduit and included in the mechanical linkage, the linkage actuation flap moving the mechanical linkage to shift the valve plate in different positions based on the direction of coolant flow in the flapper coolant conduit.

In any of the aspects described herein or combinations of the aspects, the mechanical linkage may include a plurality of external links, linkage hinges positioned between the plurality of external links, and pivots coupled to the valve plate and the linkage actuation flap.

In any of the aspects described herein or combinations of the aspects, the first operating condition may be when coolant in the coolant passage is above a threshold temperature and the second operating condition may be when coolant in the coolant passage is below the threshold temperature.

In any of the aspects described herein or combinations of the aspects, in the first position exhaust gas may flow from the exhaust gas heat exchanger conduit to an intake system.

In any of the aspects described herein or combinations of the aspects, in the second position exhaust gas may flow from the exhaust gas heat exchanger conduit to a downstream exhaust passage.

In any of the aspects described herein or combinations of the aspects, the exhaust gas heat exchanger valve may be moved into a first position through temperature dependent actuation of a wax motor in the flow reversal valve, the wax motor moving a slide valve in the flow reversal valve into a forward flow position and a reverse flow position.

In any of the aspects described herein or combinations of the aspects, the method may further include during the first operating condition, opening an exhaust gas recirculation (EGR) valve in an EGR passage coupled to a second outlet of the exhaust gas heat exchanger conduit.

In any of the aspects described herein or combinations of the aspects, the method may further include increasing the pressure of a coolant flow provided to the flow reversal valve to increase an actuation speed of the exhaust gas heat exchanger valve.

In any of the aspects described herein or combinations of the aspects, the flow reversal valve may include a wax motor configured to move a slide valve in the flow reversal valve into a forward flow position and a reverse flow position.

In any of the aspects described herein or combinations of the aspects, the EGR system may further include a spring mechanism positioned between the wax motor and the slide valve, the spring mechanism configured to decrease an actuation duration between the forward flow position and the reverse flow position of the slide valve.

In any of the aspects described herein or combinations of the aspects, a linkage actuation flap may be positioned in the flapper coolant conduit and included in the mechanical linkage, the linkage actuation flap moving the mechanical linkage to place the valve plate in different positions based on the direction of coolant flow in the flapper coolant conduit.

In any of the aspects described herein or combinations of the aspects, the mechanical linkage may include a plurality of external links, linkage hinges positioned between the plurality of external links and pivots coupled to the valve plate and the linkage actuation flap.

In any of the aspects described herein or combinations of the aspects, the method may further include increasing the pressure of a coolant flow provided to the flow reversal valve to enable actuation of the exhaust gas heat exchanger valve in a situation where a higher pressure is needed to overcome the exhaust gas pressure opposing actuation of the exhaust gas heat exchanger valve.

In any of the aspects described herein or combinations of the aspects further comprising increasing the pressure of a coolant flow provided to the flow reversal valve through an increase in the speed of the coolant pump providing the coolant flow and pressure.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, one or more of the various system configurations may be used in combination with one or more of the described diagnostic routines. The subject matter of the present disclosure includes all novel and non-obvious combinations and subcombinations of the various systems and configurations, and other features, functions, and/or properties disclosed herein.

The invention claimed is:
1. An engine system comprising:
an exhaust gas heat exchanger conduit including an exhaust gas heat exchanger valve
the exhaust gas heat exchanger valve including an actuatable valve plate;

a valve actuation assembly adjusting a position of the valve plate through operation of a mechanical linkage coupled to the valve plate; and a flow reversal valve positioned in a coolant passage, the flow reversal valve configured to reverse a coolant flow in a flapper coolant conduit to trigger actuation of the mechanical linkage.

2. The engine system of claim 1, where the valve plate is actuatable into a first and second position, in the first position the valve plate blocks a first outlet of an exhaust gas heat exchanger conduit and in the second position the valve plate blocks a section of an exhaust conduit between an inlet of the exhaust gas heat exchanger conduit and the first outlet, the first outlet opening into the exhaust conduit.

3. The engine system of claim 2, where a second outlet of the exhaust gas heat exchanger conduit opens into an exhaust gas recirculation (EGR) passage having an EGR valve.

4. The engine system of claim 2, further comprising an exhaust gas heat exchanger including a heat transfer element having one or more of a coolant conduit extending around the exhaust gas heat exchanger conduit and a heat exchanger matrix including a plurality of tubes.

5. The engine system of claim 1, where the flow reversal valve includes a wax motor configured to move a slide valve in the flow reversal valve into a forward flow position and a reverse flow position.

6. The engine system of claim 5, further comprising a spring mechanism positioned between the wax motor and the slide valve, the spring mechanism configured to decrease an actuation duration between the forward flow position and the reverse flow position of the slide valve.

7. The engine system of claim 1, where a linkage actuation flap is positioned in the flapper coolant conduit and included in the mechanical linkage, the linkage actuation flap moving the mechanical linkage to shift the valve plate in different positions based on the direction of coolant flow in the flapper coolant conduit.

8. The engine system of claim 7, where the mechanical linkage includes a plurality of external links, linkage hinges positioned between the plurality of external links, and pivots coupled to the valve plate and the linkage actuation flap.

9. A method for operation of an engine system comprising:

during a first operating condition, moving an exhaust gas heat exchanger valve into a first position where a valve plate blocks a first outlet of an exhaust gas heat exchanger conduit opening into an exhaust passage, the exhaust gas heat exchanger valve moved into the first position through a valve actuation assembly and a flow reversal valve positioned in a coolant passage, the flow reversal valve configured to reverse a coolant flow in a flapper coolant conduit of the coolant passage to trigger actuation of mechanical linkage coupled to the valve plate; and during a second operating condition, moving the exhaust gas heat exchanger valve into a second position where the valve plate blocks a section of the exhaust passage between an inlet of the exhaust gas heat exchanger conduit and the first outlet.

10. The method of claim 9, where the first operating condition is when coolant in the coolant passage is above a threshold temperature and the second operating condition is when coolant in the coolant passage is below the threshold temperature.

11. The method of claim 9, where in the first position exhaust gas flows from the exhaust gas heat exchanger conduit to an intake system.

12. The method of claim 9, where in the second position exhaust gas flows from the exhaust gas heat exchanger conduit to a downstream exhaust passage.

13. The method of claim 9, where the exhaust gas heat exchanger valve is moved into the first position through temperature dependent actuation of a wax motor in the flow reversal valve, the wax motor moving a slide valve in the flow reversal valve into a forward flow position and a reverse flow position.

14. The method of claim 9, further comprising during the first operating condition, opening an exhaust gas recirculation (EGR) valve in an EGR passage coupled to a second outlet of the exhaust gas heat exchanger conduit.

15. The method of claim 9, further comprising increasing an actuation speed if the exhaust gas heat exchanger valve by increasing a pressure of a coolant flow provided to the flow reversal valve.

16. The method of claim 9, further comprising increasing a pressure of a coolant flow provided to the flow reversal valve to enable actuation of the exhaust gas heat exchanger valve in a situation where a higher pressure is needed to overcome an exhaust gas pressure opposing actuation of the exhaust gas heat exchanger valve.

17. The method of claim 9, further comprising increasing a pressure of a coolant flow provided to the flow reversal valve through an increase in a speed of a coolant pump providing the coolant flow and pressure.

18. An exhaust gas recirculation (EGR) system comprising:

an exhaust gas heat exchanger valve including an actuatable valve plate, the valve plate being actuatable into a first and a second position, in the first position the valve plate blocks a first outlet of an exhaust gas heat exchanger conduit and in the second position the valve plate blocks a section of an exhaust passage between an inlet of the exhaust gas heat exchanger conduit and the first outlet;

a valve actuation assembly adjusting a position of the valve plate through operation of mechanical linkage coupled to the valve plate; and a flow reversal valve positioned in a coolant passage, the flow reversal valve configured to reverse a coolant flow in a flapper coolant conduit to trigger actuation of the mechanical linkage.

19. The EGR system of claim 18, wherein the flow reversal valve includes a wax motor configured to move a slide valve in the flow reversal valve into a forward flow position and a reverse flow position, and the system further comprising a spring mechanism positioned between the wax motor and the slide valve, the spring mechanism configured to decrease an actuation duration between the forward flow position and the reverse flow position of the slide valve.

20. The EGR system of claim 18, where a linkage actuation flap is positioned in the flapper coolant conduit and included in the mechanical linkage, the linkage actuation flap moving the mechanical linkage to place the valve plate in different positions based on a direction of coolant flow in the flapper coolant conduit and where the mechanical linkage includes a plurality of external links, linkage hinges positioned between the plurality of external links and pivots coupled to the valve plate and the linkage actuation flap.

* * * * *